US012404196B2

(12) United States Patent
Gregorich et al.

(10) Patent No.: US 12,404,196 B2
(45) Date of Patent: Sep. 2, 2025

(54) SYSTEMS AND METHODS FOR REMOVING PHOSPHORUS FROM WATER

(71) Applicant: COMPLETE FILTRATION RESOURCES, INC, Marshfield, WI (US)

(72) Inventors: LaVerne Gregorich, Greenwood, WI (US); Jeremy Schiller, Greenwood, WI (US); Simon Larson, Marshfield, WI (US); Shane Wiercinski, Marshfield, WI (US); John D. Ewing, Marshfield, WI (US)

(73) Assignee: COMPLETE FILTRATION RESOURCES, INC., Marshfield, WI (US)

( * ) Notice: Subject to any disclaimer, the term of this patent is extended or adjusted under 35 U.S.C. 154(b) by 0 days.

(21) Appl. No.: 18/502,956

(22) Filed: Nov. 6, 2023

(65) Prior Publication Data

US 2024/0140847 A1    May 2, 2024

Related U.S. Application Data

(63) Continuation of application No. 17/139,638, filed on Dec. 31, 2020, now abandoned.
(Continued)

(51) Int. Cl.
*C02F 9/00* (2023.01)
*B01D 61/14* (2006.01)
*B01D 61/16* (2006.01)
*B01D 63/06* (2006.01)
(Continued)

(52) U.S. Cl.
CPC .............. *C02F 9/00* (2013.01); *B01D 61/145* (2013.01); *B01D 61/16* (2013.01); *B01D 63/069* (2022.08);
(Continued)

(58) Field of Classification Search
None
See application file for complete search history.

(56) References Cited

U.S. PATENT DOCUMENTS 2,254,241 A    9/1941    Pittman et al.
5,514,282 A    5/1996    Hibbard et al.
(Continued)

FOREIGN PATENT DOCUMENTS

| FI | 94996 B | 8/1995 |
| JP | 2001-275562 | 10/2001 |
| WO | WO-2017/142494 | 8/2017 |

OTHER PUBLICATIONS

Mendonca, et al., "Destruction of Gram-Negative Food-Borne Pathogens by High pH Involves Disruption of the Cytoplasmic Membrane," Applied and Environmental Microbiology, Nov. 1994, vol. 60, No. 11, pp. 4009-4014.

*Primary Examiner* — Peter Keyworth
(74) *Attorney, Agent, or Firm* — Foley & Lardner LLP

(57) ABSTRACT

A water treatment system includes a coagulating and flocculating system, an ultrafiltration membrane, and a fluid driver. The coagulating and flocculating system includes a first inlet for receiving water and a second inlet configured to receive a coagulating and flocculating agent. The coagulating and flocculating system is configured to precipitate dissolved phosphorous from the water, and to provide a flocculated effluent at an outlet of the coagulating and flocculating system. The ultrafiltration membrane includes an inlet that is fluidly coupled to an outlet of the coagulating and flocculating system. The ultrafiltration membrane is configured to separate the precipitated phosphorus from the flocculated effluent. The fluid driver is adapted to transfer the flocculated effluent from the outlet of the coagulating and flocculating system to the inlet of the ultrafiltration membrane at sustained flux rates of at least 150 LMH.

10 Claims, 4 Drawing Sheets

Related U.S. Application Data

(60) Provisional application No. 63/111,835, filed on Nov. 10, 2020.

(51) Int. Cl.
 *C02F 1/44* (2023.01)
 *C02F 1/52* (2023.01)
 *C02F 11/127* (2019.01)
 *C02F 101/10* (2006.01)

(52) U.S. Cl.
 CPC ............ *C02F 1/444* (2013.01); *C02F 1/5245* (2013.01); *C02F 1/5281* (2013.01); *C02F 11/127* (2013.01); *B01D 2311/04* (2013.01); *B01D 2311/165* (2013.01); *B01D 2311/18* (2013.01); *B01D 2311/252* (2022.08); *B01D 2311/2642* (2013.01); *B01D 2311/2649* (2013.01); *B01D 2315/10* (2013.01); *C02F 2101/105* (2013.01); *C02F 2209/06* (2013.01); *C02F 2209/40* (2013.01)

(56) References Cited

U.S. PATENT DOCUMENTS

| | | |
|---|---|---|
| 5,783,245 A | 7/1998 | Simpson, II |
| 6,139,901 A | 10/2000 | Blazey et al. |
| 6,331,256 B1 * | 12/2001 | Kezuka .................. B01D 65/08 210/915 |
| 7,563,373 B2 | 7/2009 | Bolduc |
| 8,999,170 B2 | 4/2015 | Livingston |
| 10,118,850 B2 | 11/2018 | Gaid et al. |
| 2003/0089661 A1 * | 5/2003 | Hulten ..................... A61K 8/26 210/639 |
| 2005/0084874 A1 | 4/2005 | Belfort et al. |
| 2008/0053896 A1 | 3/2008 | Shafer et al. |
| 2008/0087607 A1 | 4/2008 | Langlais et al. |
| 2012/0255902 A1 * | 10/2012 | Livingston ........... B01D 61/145 210/151 |
| 2013/0206690 A1 | 8/2013 | Bauerle et al. |
| 2014/0124441 A1 | 5/2014 | Ikeda |
| 2019/0211279 A1 * | 7/2019 | Ginn ..................... B01J 20/043 |

\* cited by examiner

SYSTEMS AND METHODS FOR REMOVING PHOSPHORUS FROM WATER

CROSS-REFERENCE TO RELATED PATENT APPLICATIONS

The present application is a continuation of U.S. patent application Ser. No. 17/139,638, filed Dec. 31, 2020, which claims the benefit of and priority to U.S. Provisional Patent Application No. 63/111,835, entitled "Systems and Methods for Removing Phosphorus from Water" and filed Nov. 10, 2020, the entire disclosure of which is hereby incorporated by reference herein.

FIELD

The present disclosure relates generally to the field of water and wastewater treatment. More particularly, the disclosure relates to treating raw water or treated wastewater using an ultrafiltration membrane or other system producing high quality effluent containing very low organic contamination along with inorganic ortho-phosphate at levels higher than desirable/required for direct use, reuse or final environmental discharge, followed by a subsequent specialized ultrafiltration membrane process requiring previously unknown specific process control parameters to achieve ultra-low residual phosphorus concentrations.

BACKGROUND

Wastewater management (e.g., treatment, etc.) systems convert residential and/or industrial wastewater into an effluent that can be returned to the water cycle with minimum impact on the environment. Wastewater management systems often employ integrated ultrafiltration membrane biological processes to remove organic contaminants as well as bio nutrients such as phosphorus from the wastewater before discharging the effluent into a receiving body of water or waterway (e.g., pond, lake, river, stream, etc.). Phosphorus in the wastewater effluent is an established limiting nutrient that can trigger excessive biological growth (algae bloom). Algae blooms can place waterways into a eutrophic state, which can interfere with the normal limnological cycles of a waterway. Commonly, the bloom and die off of algae can create toxic conditions that may include toxins as well as oxygen deprivation. Furthermore, eutrophication stimulated by the presence of phosphorous may include stimulation of water-based weeds and grasses that clog waterways and impair historically normal uses and activities. Additionally, phosphorous levels in wells and open waterways that provide a raw water supply (e.g., potable water supply) to municipal and industrial users may require pretreatment to reduce orthophosphate levels to acceptable concentrations prior to use as a potable or process water supply.

SUMMARY

The foregoing summary is illustrative only and is not intended to be in any way limiting. In addition to the illustrative aspects, embodiments, and features described above, further aspects, embodiments, and features will become apparent by reference to the following drawings and the detailed description.

A first aspect of the present disclosure is a water treatment system. The water treatment system includes a coagulating and flocculating system and an ultrafiltration membrane. The coagulating and flocculating system includes a first inlet for receiving water and a second inlet configured to receive a singular flocculating agent. The coagulating and flocculating system is configured to precipitate dissolved reactive/ortho-phosphorous from the water using the coagulating and flocculating agent, and to provide a flocculated effluent at an outlet of the coagulating and flocculating system. The flocculated effluent includes precipitated phosphorus solids. The ultrafiltration membrane includes an inlet, a first outlet, and a second outlet. The inlet is fluidly coupled to an outlet of the coagulating and flocculating system. The fluid driver is adapted to transfer the flocculated effluent from the outlet of the coagulating and flocculating system to the inlet of the ultrafiltration membrane at sustained flux rates of at least 150 LMH. The ultrafiltration membrane is configured to separate the precipitated phosphorus solids from the flocculated effluent to provide a low-phosphorus stream at the first outlet and a high phosphorus stream at the second outlet.

In some embodiments, the coagulating and flocculating system is fluidly coupled to one of a potable water supply or a portion of a wastewater treatment system.

Another aspect is a method of treating water. The method includes receiving water and adding a coagulating and flocculating agent to the water to provide a flocculated effluent comprising precipitated phosphorus solids. The method also includes passing the flocculated effluent through an ultrafiltration membrane at sustained flux rates of at least 150 LMH to separate the precipitated phosphorus solids from the flocculated effluent and to provide a low-phosphorus stream at a first outlet of the ultrafiltration membrane and a high-phosphorus stream at a second outlet of the ultrafiltration membrane.

In some embodiments, the method further includes receiving one of a potable water supply or an at least partially treated wastewater.

Figure 1:
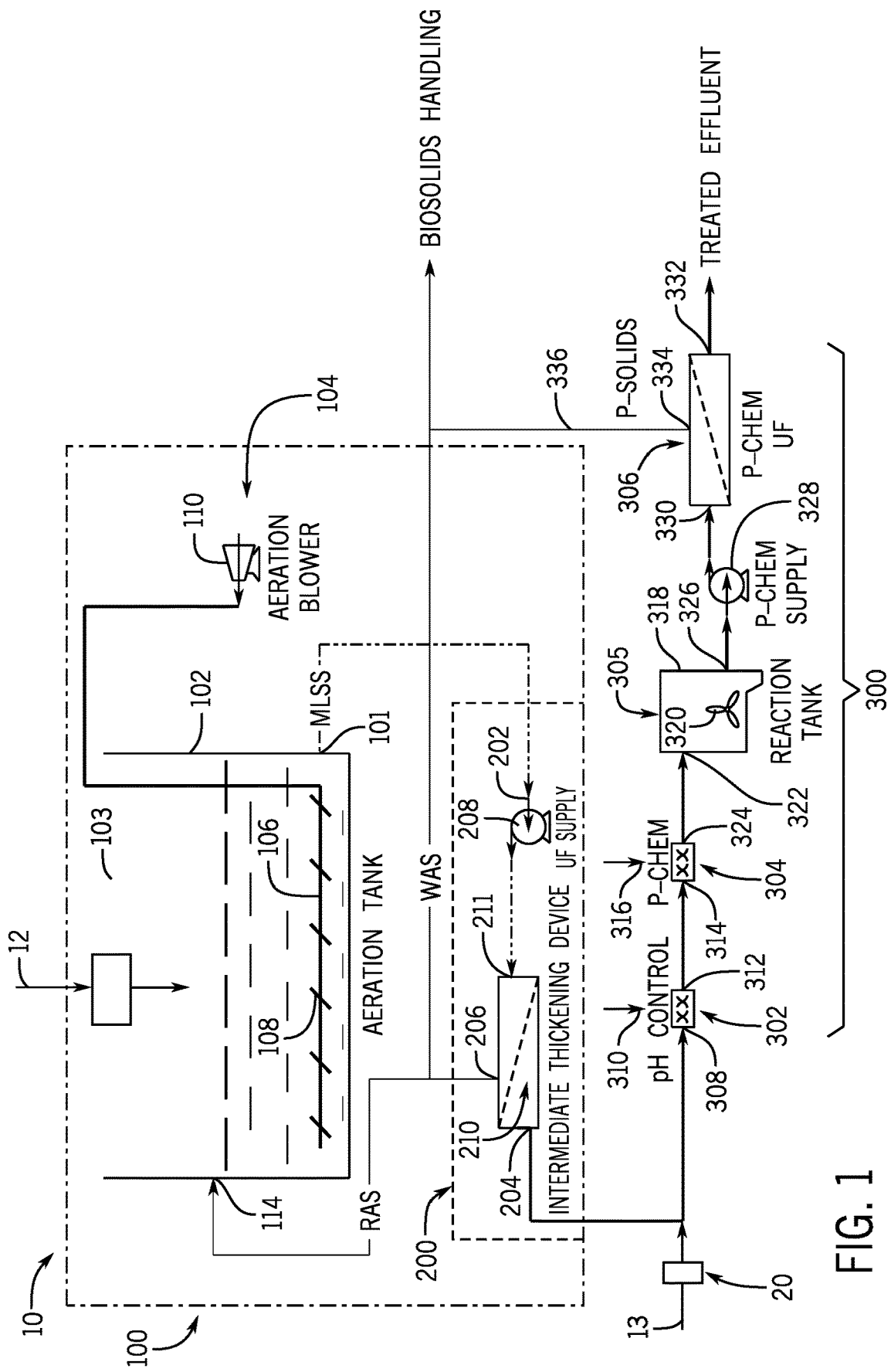
FIG. 1 is a block diagram of the water treatment system, according to an illustrative embodiment.

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Biological processes are used in wastewater treatment systems to predominately remove organic substances from the wastewater. These processes involve using living organisms (e.g., bacterial and other microorganisms) to clean the wastewater through aerobic or anaerobic processes. Biological treatment also removes nitrogen forms as well as phosphorus from the wastewater, which reduces biological growth factors in the effluent that is discharged from the wastewater treatment system. Acceptable levels of nitrogen and phosphorus in the effluent are enforced upon wastewater permit holders who direct effluent to a surface body of water or waterway (e.g., pond, lake, river, stream, etc.). Meeting phosphorus discharge limits is the most prevalent and challenging process, which in some instances can be as low as 0.075 mg/L, as P, requiring advanced processing beyond basic and enhanced biological reduction processes. Raw supply water from wells and other aquifers may also benefit from improved phosphorus removal processes, which may reduce the risk of biological growth during periods when the water is stored (before use), or prior to use as a potable or process water supply.

One aspect of the present disclosure is a water treatment system for removing phosphorus from raw water (e.g., from a potable water supply) or minimally solids laden biologically treated wastewater includes a pH control system, a coagulating and flocculating system, and an ultrafiltration membrane system applying process control parameters previously unknown to the field of application. The phosphorus removal system includes a coagulating and flocculating system and an ultrafiltration membrane system operated in a specific manner that produces exceptional process efficiency and sustainable high level membrane performance. The coagulating and flocculating system includes a first inlet fluidly coupled to an outlet of the raw water supply or minimally solids laden biological treatment system and a second inlet configured to receive a flocculating agent. The coagulating and flocculating system is configured to precipitate dissolved phosphorus, and to provide the precipitated phosphorus at an outlet of the coagulating and flocculating system. The ultrafiltration membrane includes an inlet fluidly coupled to the outlet of the coagulating and flocculating system. The ultrafiltration membrane is configured and process controlled to separate the precipitated phosphorus from the effluent.

One aspect of the present technology relates to a wastewater treatment system that includes an integrated ultrafiltration based biological treatment system commonly referred to as a membrane bioreactor and a subsequent process controlled chemical addition and concentration based phosphorus removal system. The treatment system is configured to receive untreated wastewater and to produce a wastewater effluent having a negligible biodegradable organics (i.e., negligible biological oxygen demand (BOD)) and solids concentration with a particle size typical of ultra-filtered water. As used herein, a negligible biodegradable organics concentration refers to an organic solids concentration (both dissolved and undissolved solids) of less than approximately 50 mg/L, 40 mg/L, 30 mg/L, 20 mg/L, 10 mg/L, or less, or a range between and including any two of the foregoing values. The phosphorus removal system may include a pH control and coagulating and flocculating chemical dosing system. The pH control and coagulating and flocculating system includes a first inlet fluidly coupled to an outlet of the ultrafiltration based treatment system. The coagulating and flocculating system is configured to chemically precipitate dissolved phosphorus (aka Ortho-phosphorous, reactive phosphorous), and to provide the reacted/precipitated phosphorus at an outlet of the coagulating and flocculating system. The ultrafiltration membrane system includes an inlet fluidly coupled to the outlet of the coagulating and flocculating system. The ultrafiltration membrane is configured to separate the chemically bound portion of the phosphorus from the effluent.

Another aspect of the present technology is a method. The method includes passing a raw water supply or an MBR treated wastewater through a pH adjustment (e.g., control) system to produce a water or treated wastewater supply at a pH that is suitable for coagulating and flocculating chemical addition and efficient binding reaction with the reactive phosphorous present in the supply. The method also includes adding a coagulating and flocculating agent to the pH-adjusted water or treated wastewater effluent to provide a flocculated effluent that includes precipitated phosphorus. The method further includes passing the flocculated effluent into a specific process-controlled ultrafiltration membrane system to separate the precipitated phosphorus from the flocculated effluent. The specific process control parameters required for efficient and sustainable high performance of the ultrafiltration process are previously unknown to the field of application and provide a distinct advantage over current technologies in the field of application.

Referring generally to the figures, a system for treating water is shown, according to various illustrative embodiments. In particular, a system for removing phosphorus from a raw water supply as well as an appropriately treated wastewater effluent is shown that uses chemicals to control pH and precipitate phosphorus in the effluent, and an ultrafiltration membrane to remove the precipitated phosphorus with high removal efficiency.

Referring to FIG. 1, a block diagram of a water treatment system 10 is shown, according to an illustrative embodiment. The water treatment system 10 includes pre-treatment system 100, an intermediate thickening system 200, and a phosphorus removal system 300. The water treatment system 10 also includes an optional pre-filtration system 15 for a raw water supply. In other embodiments, the water treatment system 10 may include additional, fewer, and/or different components. For example, in an embodiment where the water treatment system is used to treat only raw water (e.g., from a well, open waterway, etc.), the pre-treatment system 100 (and the intermediate thickening system 200) is not necessary. In an embodiment where the water treatment system 10 is used to treat wastewater, the water treatment system 10 may optionally include a sludge dewatering system in addition to the intermediate thickening system or in place of the intermediate thickening system. The sludge dewatering system may include one or a plurality of ultrafiltration membranes to increase the concentration of solids in biosolids that are discharged from the water treatment system 10. For example, the sludge dewatering system may include at least one tubular cross-flow membrane that provides filtration in an inside-out flow arrangement as will be further described with reference to FIGS. 2-3. In other embodiments, another type of ultrafiltration configuration may be used (e.g., a tubular crossflow membrane that provides filtration in an outside-in flow arrangement, etc.). Additionally, the arrangement of optional fluid drivers (e.g., pumps, etc.) between components in the water treatment system 10 may differ from that shown in FIG. 1.

In wastewater treatment applications, a first portion of the pre-treatment system 100 (e.g., aeration system, biological treatment system, etc.) is configured to receive untreated wastewater and to agitate the wastewater to produce a partially treated wastewater (e.g., mixed liquor suspended solids, etc.). As used herein, the term "suspended solids" refers to undissolved solid particles which remain suspended in the wastewater as a colloid or due to the motion of the water with a particle size greater than 0.45 μm as defined in (Standard Methods). The suspended solids include biological organics and other solid particles (dirt, etc.). A second portion of the pre-treatment system 100 (e.g., the intermediate thickening system 200) is configured to receive the partially treated wastewater and to produce a wastewater effluent at a first outlet 204 of the pre-treatment system 100. The pre-treatment system 100 may be one of a variety of aerobic or anaerobic processes that facilitate biological treatment of wastewater. For example, the first portion may include a fixed film biological treatment system (e.g., a standalone fixed film biological treatment system, an integrated fixed film biological treatment system and mixed aerobic treatment system, etc.). As shown in FIG. 1, the fixed film biological treatment system 103 may include a trickling filter including a support system and media (e.g., a stacked type media, random dump type media, etc.). The trickling filter may form part of a trickling filter activated sludge (TF/AS) system or a trickling filter solids contact (TF/AS) system, or another fixed film biological treatment configuration. In another embodiment, the first portion may include another form of biological treatment system capable of reducing organic contamination. The biological treatment system may be integrated with a membrane separation system, forming a membrane bioreactor process. In the embodiment of FIG. 1, the pre-treatment system 100 includes an aeration system configured to introduce air into wastewater to oxygenate the wastewater and to begin the process of aerobic digestion (e.g., the breakdown of organic matter using excess oxygen). As shown in FIG. 1, the aeration system is fluidly connected to an outlet of the fixed film biological treatment system 103. In another embodiment, the first portion does not include the fixed film biological treatment system 103 or includes another type of biological treatment system. The aeration system includes an aeration tank 102 configured to receive untreated wastewater. The aeration tank 102 may be a tank, basin, or another type of fluid reservoir that is fluidly coupled to an inlet line 12 (e.g., conduit, wastewater feed line, etc.) of the water treatment system 10. The pre-treatment system 100 also includes a mixing system 104 configured to mix or agitate the wastewater in the aeration tank 102.

In some embodiments, the aeration system is configured to introduce air bubbles into the wastewater. For example, as shown in FIG. 1, the mixing system 104 includes an air distribution conduit 106 disposed proximate to a floor (e.g., lower wall, bottom wall, etc.) of the aeration tank 102. The air distribution conduit 106 includes a plurality of branches 108 disposed in approximately equal intervals along the floor. In some embodiments, the air distribution conduit 106 includes nozzles, screens, or other flow distribution devices to dispense air uniformly along the floor. The mixing system 104 additionally includes a fluid driver 110 (e.g., blower, compressor, etc.) that is fluidly coupled to the air distribution conduit 106 and is configured to provide air to aeration tank 102 through the air distribution conduit 106.

The structure of the mixing system 104 may differ in various illustrative embodiments. For example, the mixing system 104 may include a motor driving a shaft with paddles to mix the wastewater within the aeration tank 102, or another form of mixer.

In one embodiment, the pre-treatment system 100 also includes an intermediate thickening system 200. As shown in FIG. 1, an outlet 101 of the aeration tank 102 is fluidly coupled (e.g., fluidly connected, etc.) to an inlet 202 of the intermediate thickening system 200. The intermediate thickening system 200 is configured to separate solids (e.g., undissolved biological organics, etc.) above a particle size of ultra-filtered water (0.045 μm) from the partially treated wastewater to produce a wastewater effluent having negligible biological organics at a first outlet 204 of the intermediate thickening system 200. The intermediate thickening system 200 is configured to produce a concentrated activated sludge at a second outlet 206 of the intermediate thickening system 200 containing separated biological organics and other solid particles. Due to the additional water removal provided by the intermediate thickening system 200, the concentration activated sludge will have a higher concentration of solid particles as compared to the partially treated wastewater entering the intermediate thickening system 200. For example, the intermediate thickening system 200 may produce a concentrated activated sludge having a second concentration of solids, by mass (e.g., a ratio of the mass of undissolved solids divided by the total mass of the fluid), of at least approximately 1.0% (or 1.25%, 1.5%, 1.75%, 2%, 2.5%, 5.0% or a range between and including any two of the foregoing values, e.g., at least approximately 1.0% to approximately 5.0%) from a partially treated wastewater having a first concentration of solids of at least approximately 0.3%, 0.4%, 0.6%, 0.8% 1.0%, 1.2%, or a range between and including any two of the foregoing values (e.g., at least approximately 0.3% to approximately 1.2%, etc.). In other embodiments, the concentration of solids in the partially treated wastewater and/or the increase in the concentration of solids provided by the intermediate thickening system 200 may be different.

As shown in FIG. 1, the intermediate thickening system 200 may include a fluid driver 208 (e.g., a fluid transfer device, a pump, etc.) and a thickening device 210 that is fluidly coupled to the fluid driver 208 (e.g., an outlet of the fluid driver 208). The fluid driver 208 is configured to transfer the partially treated wastewater from the aeration tank 102 to other parts of the intermediate thickening system 200. The thickening device 210 is configured to separate solids from the partially treated wastewater received from the fluid driver 208 to generate a wastewater effluent and a concentrated activated sludge having a greater concentration of solids, by mass, than the partially treated wastewater. According to an exemplary embodiment, the thickening device 210 is a membrane bioreactor (MBR) that includes a filtration membrane. In other embodiments, the thickening device 210 is another type of sludge dewatering/separation/thickening device, such as a dissolved air floatation system, a clarifier, plate settler, a holding tank, a decanting tank, a screw press, a belt press, or another sludge dewatering system/device known to those of ordinary skill in the art. Among other benefits, the MBR process allows for much higher concentrations of mixed liquor suspended solids (MLSS) in the aeration tank 102.

As shown in FIG. 1, the second outlet 206 of the intermediate thickening system 200 is fluidly coupled to both a second inlet 114 of the aeration tank 102 and an outlet of the water treatment system 10 (e.g., a discharge line, conduit, etc.). In some embodiments, the second inlet 114 may be directly fluidly coupled to inlet line 12. In other embodiments, the second inlet 114 may be a separate inlet line/conduit to the aeration tank 102. A first portion of the concentrated activated sludge (e.g., return activated sludge) leaving the intermediate thickening system 200 returns to the aeration tank 102 through the second inlet 114. This first portion, which is re-introduced into the wastewater in the aeration tank 102, ensures a healthy level of bacteria is maintained within the aeration tank 102 to facilitate aerobic digestion. A second portion of the concentrated activated sludge is discharged from the wastewater treatment system 10 along with any other biosolids removed from the wastewater during the treatment operation.

In raw water treatment applications, the phosphorus removal system 300 receives raw water directly from a well or open waterway, shown as water source 13. The raw water may include solid particles and other contamination that is removed by the pre-filtration system 20. The pre-filtration system 20 may include a sand filter, filtration membrane, multimedia filters, or another type of filtration device to separate solid particles from the raw water before passing the raw water to the phosphorus removal system 300.

The phosphorus removal system 300 is configured to reduce the concentration of phosphorus that is contained in the wastewater effluent and/or raw water. For example, the phosphorus removal system 300 may be configured to reduce the concentration of phosphorus to levels enforced upon wastewater permit holders (e.g., by regulation, etc.) such as levels of approximately 1.0 mg/L, 0.5 mg/L, 0.3 mg/L, 0.2 mg/L, 0.1 mg/L, 0.075 mg/L, 0.065 mg/L or less, or a range between and including any two of the foregoing values (e.g., levels of approximately 1.0 mg/L or less to approximately 0.2 mg/L or less). The phosphorus removal system 300 is configured to handle an extremely large range of phosphorus influent such as 10 mg/L, 20 mg/L, 30 mg/L, 40 mg/L, 50 mg/L, 60 mg/L, 70 mg/L, and 80 mg/L, or a range between and including any two of the foregoing values (e.g., 10 mg/L-80 mg/L, 30 mg/L-60 mg/L, 40 mg/L-50 mg/L, etc.). In some embodiments, the phosphorus removal system 300 is configured to reduce a concentration of phosphorus in mg/L by a factor of approximately 60, 70, 80, 90, 100, 200, or greater, or a range between and including any two of the foregoing values. For example, in a scenario where the flow rate of effluent entering the phosphorus removal system 300 is approximately 500,000 gallons per day (gal/day), the phosphorus removal system 300 may be configured to reduce precipitated phosphorus (e.g., phosphate ($PO_4$)) from 12 mg/L phosphate in the effluent/feed to 0.2 mg/L phosphate (e.g., by a factor of 60) in the membrane permeate leaving the phosphorus removal system 300. In other embodiments, the amounts of phosphorus removed by the phosphorus removal system 300 may be different.

As shown in FIG. 1, the phosphorus removal system 300 includes a pH control system 302, a coagulating and flocculating system 304 (e.g., a coagulating and flocculating chemical dosing system), a reaction system 305, and an ultrafiltration membrane 306. In other embodiments, the phosphorus removal system 300 may include additional, fewer, and/or different subsystems and components. For example, the phosphorus removal system 300 may not require the pH control system 302 and/or the reaction system 305, depending on the chemical used and the reaction kinetics (e.g., the rate of reaction with dissolved phosphorus, etc.). The pH control system 302 may be a continuous-flow-through pH adjustment system configured to continuously receive and process the effluent/feed at a given flow rate. In other embodiments, the pH control system 302 is a batch pH adjustment system configured to process/treat a batches of effluent/feed of fixed volume at one time (e.g., non-continuous flow). In yet other embodiments, the pH control system 302 is some combination of a continuous-flow-through pH adjustment system and a batch pH adjustment system. As shown in FIG. 1, a first inlet 308 of the pH control system 302 is fluidly coupled to one of (i) the pre-treatment system 15 to receive raw water (e.g., feed supply, etc.) discharged from the pre-treatment system 15, or (ii) the intermediate thickening system 200 (e.g., an outlet of the ultrafiltration membrane 210) to receive wastewater effluent discharged from the intermediate thickening system 200. A second inlet 310 of the pH control system 302 is fluidly coupled to a dispensing system and is configured to receive a chemical from the dispensing system. The chemical may be an acid such as hydrochloric acid (HCl) having a pH less than 7 or a base (e.g., caustic, alkaline, alkali, etc.) such as sodium hydroxide having a pH greater than 7. In other embodiments, the chemical may be sulfuric acid or carbon dioxide, or some combination of the foregoing acids or bases. In other embodiments, the pH control system 302 includes separate inlets for the acid and the base to prevent cross contamination.

The pH control system 302 is configured to introduce the chemical to the effluent/feed to adjust the pH of the effluent/feed and thereby provide an optimal environment for phosphorus precipitation. In some embodiments, the pH control system 302 includes a treatment tank, basin, or reservoir configured to receive effluent/feed and the chemical. The flow rate of chemical into the treatment tank may be carefully controlled by metering pumps and/or valves coupled to the second inlet 310 (e.g., to a second inlet line). The pH control system 302 may also include a mixer configured to mix or agitate the contents of the treatment tank to ensure the chemical is uniformly distributed within the effluent/feed. The pH control system 302 may further include a pH probe to determine the pH of the pH-adjusted effluent/feed leaving the pH control system 302. The pH probe may be disposed within a fluid receiving volume of the treatment tank (e.g., near an outlet 312 of the treatment tank and/or pH control system 302) such that it is at least partially submerged in the effluent/feed. In other embodiments, the number and/or arrangement of components used in the pH control system may be different. For example, in some embodiments the pH control system 302 may include a portion of a fluid conduit proximate to an intersection between the first inlet 308 and the second inlet 310 instead of a treatment tank. The conduit may include fins, vanes, or other flow mixing features to facilitate mixing of the effluent/feed with the acid and/or base to generate the pH-adjusted effluent. According to an illustrative embodiment, the pH of the pH-adjusted effluent/feed leaving the pH control system 302 is within a range between approximately 5 and 8, or within a range between approximately 6.5 and 7.5, or within another suitable range. In some embodiments, the pH range of the pH-adjusted effluent/feed may vary based on the flocculating agent introduced into the pH-adjusted effluent/feed/fee by the coagulating and flocculating system 304.

The coagulating and flocculating system 304 is configured to selectively precipitate out dissolved reactive/orthophosphorus within the pH-adjusted effluent/feed so that it can be removed by the ultrafiltration membrane 306. As shown in FIG. 1, a first inlet 314 of the coagulating and flocculating system 304 is fluidly coupled to the outlet 312 of the pH control system 302 and is configured to receive pH-adjusted effluent/feed from the pH control system 302. A second inlet 316 of the coagulating and flocculating system 304 is fluidly coupled to a flocculant dispensing system. In some embodiments, the flocculant dispensing system includes a conduit (e.g., fluid line, etc.) that is fluidly coupled to a holding tank and/or reservoir containing a flocculating agent. The flocculating agent (e.g., flocculant, clarifying agent, etc.) is a substance which promotes the precipitation (e.g., clumping) and/or adsorption of phosphorus into solid particles that can be removed from the pH-adjusted effluent/feed by further filtration technologies such as ultrafiltration. The flocculating dispensing system adds the flocculating agent to the pH-adjusted effluent/feed to provide a flocculated effluent that include reacted/precipitated phosphorus (e.g., suspended phosphorus, as P, etc.). The flocculating agent may be an aluminum salt, an iron salt, or a rare earth metal salt. For example, the flocculating agent may be at least one of alum, a ferric or ferrous salt, poly aluminum chloride, aluminum chlorohydrate (ACH), or a rare earth material, or the like. In some embodiments, the flocculating agent may be a combination of different chemicals. For example, the flocculating agent may include a less expensive chemical such as alum and also a rare earth material (e.g., in lower quantity than the alum) to polish. The flocculant dispensing system may include valves, pumps, or another fluid metering device to ensure an appropriate amount of the flocculating agent is introduced into the pH-adjusted effluent/feed received from the first inlet 314. The coagulating and flocculating system 304 may include a tank to facilitate mixing and/or uniform distribution of the flocculating agent with the pH-adjusted effluent/feed. In other embodiments, the coagulating and flocculating system 304 includes a conduit proximate to an intersection between the first inlet 314 and the second inlet 316 instead of a tank.

The reaction system 305 is configured to facilitate mixing of the at least partially flocculated effluent/feed with the at least one of the chemical or the flocculating agent and to maximize the amount of precipitated phosphorus. As shown in FIG. 1, the reaction system 305 includes a reaction vessel configured to hold a volume of flocculated effluent/feed. The reaction vessel 318 may be a tank, basin, or other fluid reservoir. The reaction system 305 also includes a mixer 320 disposed at least partially within the reaction vessel 318, within a fluid receiving portion of the reaction vessel 318. As shown in FIG. 1, the mixer 320 is disposed proximate to a lower wall of the reaction vessel 318. In other embodiments, the location of the mixer 320 may be different (e.g., the mixer 320 may be positioned near a side wall, or only partially submerged below a waterline of the reaction vessel 318, etc.). The mixer 320 is configured to mix, agitate, or otherwise perturb the contents of the reaction vessel 318. For example, the mixer 320 may be a turbine, a shaft rotating a set of paddles, or another mechanical mixing device.

As shown in FIG. 1, an inlet 322 of the reaction vessel 318 is fluidly coupled to an outlet 324 of the coagulating and flocculating system 304 and is configured to receive flocculated effluent/feed from the coagulating and flocculating system 304. An outlet 326 of the reaction vessel 318 is fluidly coupled to the ultrafiltration membrane 306 via a second fluid driver 328 (e.g., pump, etc.). In other words, the reaction vessel 318 is disposed between the coagulating and flocculating system 304 and the ultrafiltration membrane 306. The second fluid driver 328 is configured to transport flocculated effluent/feed from the reaction system 305 to the ultrafiltration membrane 306. The second fluid driver 328 may be the same as or similar to the fluid driver 208. In other embodiments, a fluid mixing device (e.g., reaction system) may be integrated with at least one of the pH control system 302 or the coagulating and flocculating system 304 as described above without a separate reaction vessel 318 and mixer 320. For example, the phosphorus removal system 300 may rely on reaction kinetics (e.g., the rate of reaction of one or more chemicals with dissolved phosphorus) instead of a separate reaction vessel 318 and/or mixer 320 as described above. The arrangement of the reaction system 305 may be different in various illustrative embodiments.

The ultrafiltration membrane 306 is configured to separate a chemically bound portion of the phosphorus from the flocculated effluent/feed to generate a treated effluent/feed (e.g., a low-phosphorus stream) having a lower concentration of phosphorus solids, by mass, than the flocculated effluent/feed entering the ultrafiltration membrane 306. As shown in FIG. 1, an inlet 330 of the ultrafiltration membrane 306 is fluidly coupled to the outlet 326 of the reaction system 305 via the second fluid driver 328. The treated effluent/feed is ejected from the ultrafiltration membrane 306 through a first outlet 332 of the ultrafiltration membrane 306. The treated effluent leaving through the first outlet 332 of the ultrafiltration membrane 306 can be further processed for water reuse or discharged to a surface body of water (e.g., a waterway, etc.). In a raw water treatment application, the treated feed can be delivered for use as clean, potable water. Removed solids (e.g., solid particles, precipitated solids), including a majority of the precipitated phosphorus solids are discharged through a second outlet 334 of the ultrafiltration membrane 306. In other words, the ultrafiltration membrane 306 provided a high-phosphorus stream at the second outlet 334. In the embodiment of FIG. 1, the removed solids are combined (e.g., via fluid conduit 336) with at least a portion of the concentrated activated sludge leaving the intermediate thickening system 200. In other words, the second outlet 334 of the ultrafiltration membrane 306 is fluidly coupled to the second outlet 206.

Figure 2:
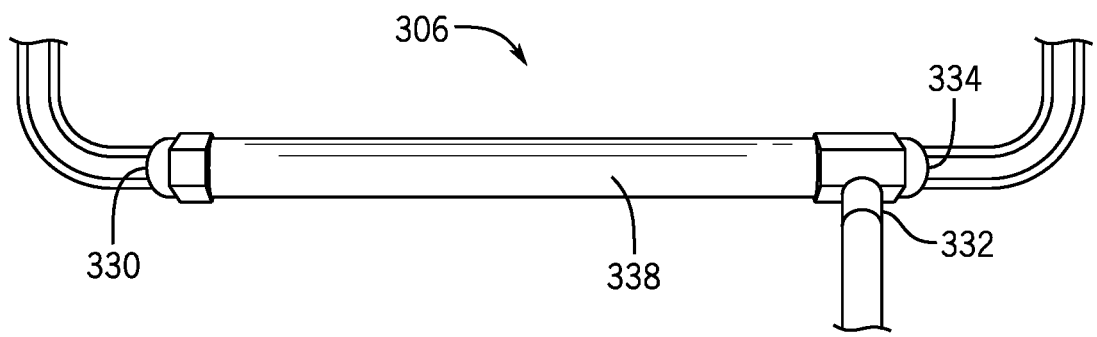
FIG. 2 is a side view of an ultrafiltration membrane of the water treatment system of FIG. 1.
Figure 3:
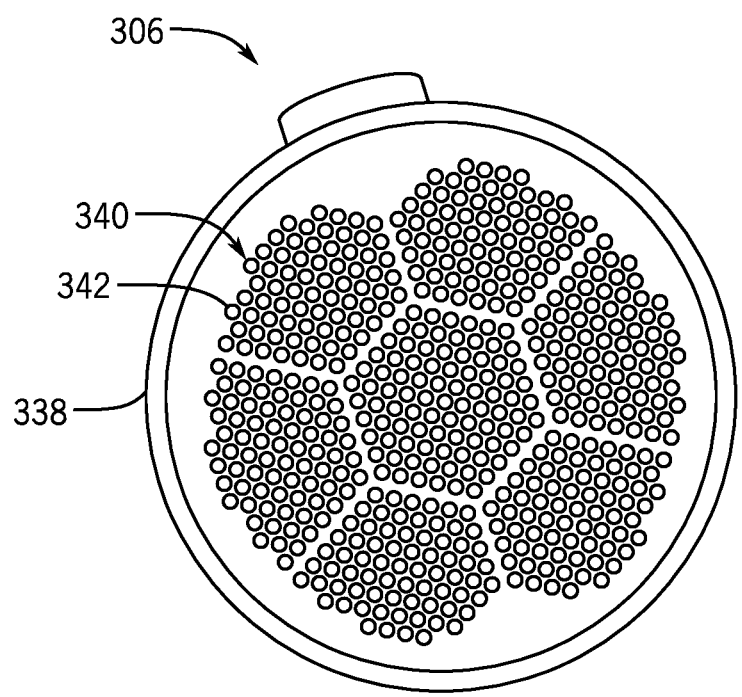
FIG. 3 is a front cross-sectional view of the ultrafiltration membrane of FIG. 2.

FIGS. 2 and 3 are side and front views, respectively, of the ultrafiltration membrane 306 of FIG. 1. In some embodiments, a similar ultrafiltration membrane may also be used for the ultrafiltration membrane 210 of the intermediate thickening system 200 (e.g., in a wastewater treatment application). As shown in FIG. 2, the ultrafiltration membrane 306 may be a tubular crossflow membrane that includes a cylindrical housing 338 and a plurality of cylindrical tubes 340 disposed within the housing 338. The housing 338 isolates the tubes 340 from an environment surrounding the ultrafiltration membrane 306 and guides the flow of flocculated effluent/feed through the tubes 340. As shown in FIG. 3, the tubes 340 are stacked together within the housing 338. In other embodiments, the cross-sectional shape of the housing 338 and/or arrangement of tubes 340 within the housing 338 may be different than shown in FIG. 3.

Figure 4:
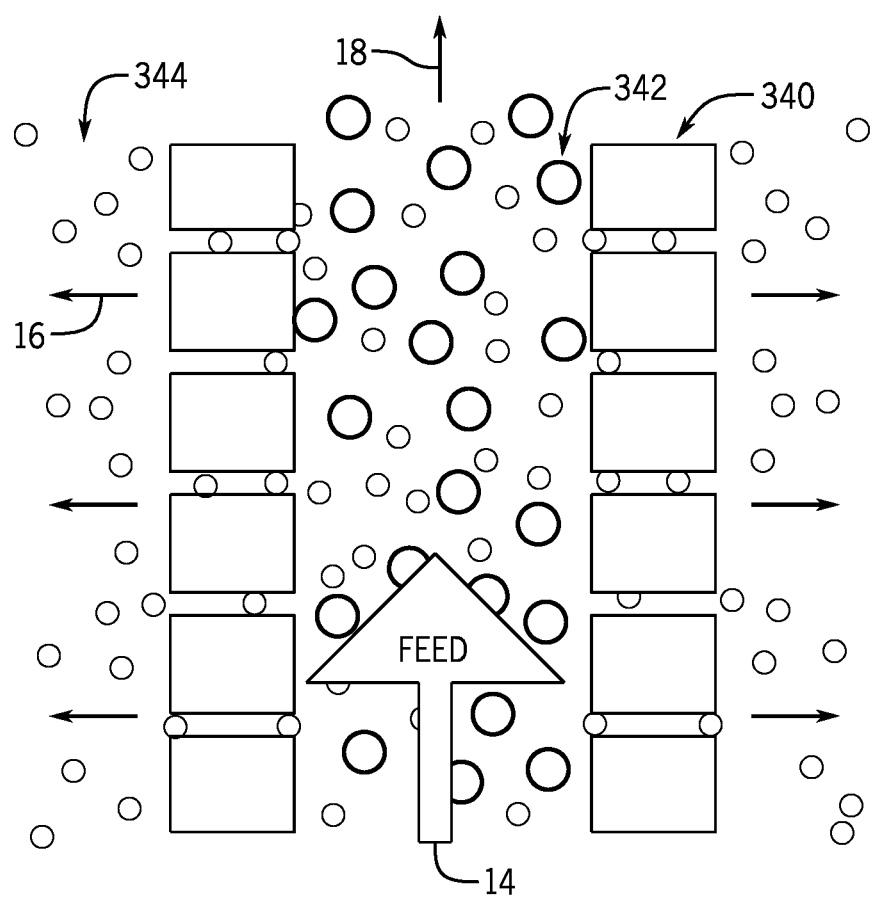
FIG. 4 is a conceptual representation of flow passing through the ultrafiltration membrane of FIG. 2.

The tubular crossflow membrane filters the flocculated effluent/feed using an inside-out flow arrangement such that the liquid permeates outwardly through the walls of the crossflow membrane. During operation, the flocculated effluent/feed is received (from the reaction system 305 of FIG. 1) at the inlet 330 of the housing 338, within channels 342 defined by tubes 340 (see FIG. 3). FIG. 4 is a side cross-sectional view through one of the tubes 340 of the tubular crossflow membrane of FIGS. 2 and 3. As shown in FIG. 4, the flocculated effluent/feed 14 travels along the length of tubes 340, in a substantially axial direction through the channels 342 (e.g., parallel to the axis of each of the channels 342). The fluid pressure in the channels 342 separates water (e.g., treated effluent/feed 16) from the flocculated effluent/feed 14 through the walls of the tubes 340 along a radial direction (e.g., radially outward away from the central axis of the tubes 340), while solid particles (e.g., precipitated phosphorus 18, as P) continue along the axial direction through the channels 342 and toward the second outlet 334. Water (e.g., treated effluent/feed) that is separated from the flocculated effluent/feed exits the housing 338 through a hollow cavity 344 (e.g., space, interior volume) formed between an outer surface of the tubes 340 and a wall of the housing 338. Among other benefits, using a tubular crossflow membrane to separate solids from the flocculated effluent/feed allows for higher flux rates (e.g., throughput rates of phosphorus) in a smaller footprint as compared to traditional phosphorus removal systems. The tubular crossflow membrane provides a solid physical barrier that provides high phosphorus removal capacity over a wide operating range (e.g., flow rate range, etc.). The byproduct (e.g., output) from the tubular crossflow membrane is a highly concentrated sludge that can be easily managed and/or transported from the system.

The filtering process carefully controlled using previously unknown specific process control parameters involving total suspended solids concentration and cross-flow velocities to achieve ultra-low residual phosphorus concentrations at previously unknown membrane flux rates and process duration. The concentration of undissolved solids (e.g., precipitated phosphorus solids, etc.) entering the ultrafiltration membrane 330 may be, for example, approximately 0.5 mg/L, 1.0 mg/L, 2.0 mg/L, 2.2 mg/L, 2.4 mg/L, 3.0 mg/L, or greater, or a range between and including any of the foregoing values (e.g., approximately 0.5 mg/L to approximately 3.0 mg/L, etc.) (also see above). The concentration of recirculated solids within the ultrafiltration membrane 306 may be highly concentrated, e.g., to approximately 1% total suspended solids (TSS) (10,000 mg/L), or 2% TSS, 3% TSS, 4% TSS, 5% TSS, or greater, or a range between and including any two of the foregoing values (e.g., approximately 1% to approximately 5%, etc.) in some embodiments (the water content of the recirculating solids may be, for example, 99%, 98%, 97%, 96%, 95%, or less in some embodiments). As used herein, % TSS refers to the ratio of the mass of undissolved solids (e.g., phosphorus as chemically-bound flocs) over the total mass of the fluid (i.e., parts per million). Additionally, the phosphorus removal system 10 (e.g., ultrafiltration membrane 306) is operated at high flux rates to separate the phosphorus from the wastewater. According to an exemplary embodiment, the ultrafiltration membrane 306 is sized receive (e.g., recirculate) flocculated effluent/feed at flux rates within a range between approximately 40 liters/m$^2$/hr (LMH) and 400 LMH, e.g., at least 150 LMH, 200 LMH, 250, LMH, 300 LMH, 350 LMH, 400 LMH, or a range between and including any two of the foregoing values. The combination of the high inorganic solids concentration of the influent, optimized cross flow velocity produces high flux rates and minimizes fouling of the ultrafiltration membrane 306 during normal operation, thereby enabling continuous (e.g., sustained) and efficient separation of the reacted/precipitated phosphorus. As used herein, the term "sustained" refers to an operating duration of the ultrafiltration membrane 306 that can be achieved without cleaning. For example, operation at "sustained flux rates of at least 150 LMH" may refer continuous operation of the ultrafiltration membrane 306 at a flux rate of at least 150 LMH for at least a period of weeks (e.g., 4 weeks, 12 weeks, 6 months, 1 year, or greater, or a range between and including any two of the foregoing values, etc.). These unique process conditions (e.g., exceptional flux rates at specific cross flow velocities and high inorganic solids concentrations of the influent) increases the operating duration for the ultrafiltration membrane 306 and allows for a reduction in the overall size of the membrane system (in part, because of the reduction in fouling associated with these unique process conditions). These process conditions, through the ultrafiltration membrane 306, also increases the solids concentration at the outlet of the membrane 306, which minimizes solids handling requirements.

Figure 5:
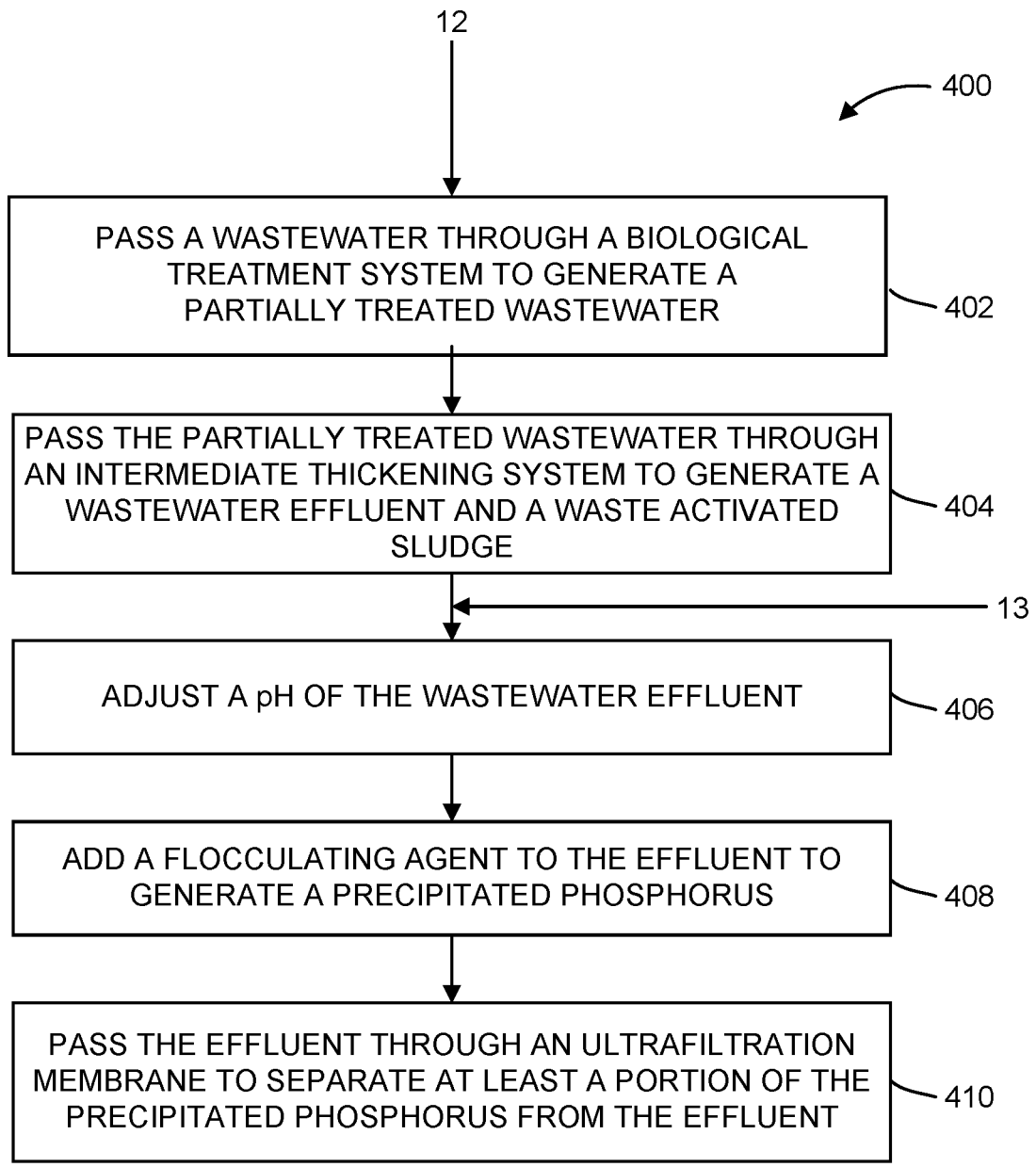
FIG. 5 is a flow diagram of a method of removing phosphorus from a pretreated wastewater as well as a general water, according to an illustrative embodiment.

FIG. 5 is a flow diagram of a method 400 of removing phosphorus from water (e.g., raw/potable water or wastewater). In other embodiments, the method 400 may include additional, fewer, and/or different operations. Method 400 may be implemented with the water treatment system 10 of FIG. 1. Accordingly, method 400 may be described with regards to FIG. 1. Although the method 400 of FIG. 5 is described with reference to treating wastewater, it will be appreciated that similar operations may be used to treat raw water 13; in particular, the pH control and flocculated chemical dosing operations 406-410.

At 402, wastewater 12 is passed through a biological treatment system to generate a partially treated wastewater. Operation 402 may include passing the wastewater 12 through a fixed film biological treatment system (e.g., a trickling filter system) and/or agitating the wastewater 12 using an aeration system to generate the partially treated wastewater. Operation 402 may include receiving the wastewater 12 in an aeration tank of the aeration system, through a feed line that is coupled to the aeration tank. Operation 402 may additionally include passing a volume of air into the aeration tank to oxygenate the wastewater. The volume of air may be provided by a fluid driver (e.g., a blower, compressor, etc.) through a fluid conduit that is positioned at least partially within the aeration tank. Alternatively, or in combination, operation 402 may include mixing the wastewater within the aeration tank using a mechanical agitator (e.g., a paddle, conveyer, etc.).

At 404, the partially treated wastewater is passed through an intermediate thickening system to generate a wastewater effluent and a concentrated activated sludge. Operation 404 may include pumping (e.g., via a fluid driver) or otherwise transferring the partially treated wastewater from an outlet of the aeration system to an inlet of the intermediate thickening system. Operation 404 may also include passing the partially treated wastewater through a filtration membrane, a DAF, a clarifier, or another dewatering system/device to increase the concentration of solids in the sludge. Operation 404 may further include returning a first portion of the concentrated activated sludge to the aeration system to facilitate aerobic digestion of the wastewater within the aeration tank.

At 406-410, the wastewater effluent is passed through a phosphorus removal system to generate a further treated effluent to meet strict discharge limits. In other embodiments, operations 406-410 may be used as pretreatment for a raw/potable water supply, to reduce orthophosphate levels to acceptable concentrations prior to use as a potable or process water supply. In such embodiments, the method 400 may further include passing the raw water through a pre-filtration system (e.g., pre-filtration system 20) to separate organics and solids above a predefined size from the raw water feed.

At 406, the pH of the wastewater effluent is adjusted, by a pH control system, to provide an optimal environment for phosphorus precipitation. Operation 406 may include introducing an acid or a base into the effluent flow. Operation 406 may additionally include monitoring the pH of the effluent within and/or leaving the pH control system (e.g., via a pH probe, etc.). Operation 406 may further include controlling a flow rate of acid or base into the wastewater effluent based on the monitored pH value (e.g., increasing the flow rate of acid based on a determination that the pH of the effluent leaving the pH control system is above a predefined threshold value, etc.). Operation 406 may further include mixing the effluent after the addition of acid or base to ensure that the acid or base is uniformly distributed throughout the effluent.

At 408, the pH-adjusted effluent is passed through a coagulating and flocculant dispensing system to precipitate phosphorus, as P, from the effluent. Operation 408 may include introducing a coagulating and flocculating agent into to the pH-adjusted effluent received from the pH control system. The flocculating agent may be one of alum, ferric salt, ploy aluminum chloride, ACH, a rare earth material, and/or another clarifying agent. Operation 408 may additionally include mixing the pH-adjusted effluent after the addition of the flocculating agent to maximize the amount of phosphorus precipitate for a given amount of flocculating agent (e.g., a given amount of flocculating agent per unit volume of effluent).

At 410, the flocculated effluent leaving the coagulating and flocculating system is passed through an ultrafiltration membrane to separate at least a portion of the reacted/precipitated phosphorus from the flocculated effluent. Operation 410 may include passing flocculated effluent through channels of a tubular crossflow membrane, from an inside of the channels to an outside of the tubular crossflow membrane at a greater radial position than the inside. In one embodiment, operation 410 includes passing the flocculated effluent through the channels of the tubular crossflow membrane at velocity (e.g., face velocity, etc.) within a range between approximately 0.5 meters per second (m/s) and 5 m/s, or higher. For example, operation 410 may include passing the flocculated effluent through the ultrafiltration membrane at a velocity of approximately 0.5 m/s, 0.75 m/s, 1 m/s, 2 m/s, 3 m/s, 4 m/s, 5 m/s, or a range between and including any two of the foregoing values. Passing the flocculated effluent, at high concentrations of inorganic solids (e.g., phosphorus solids), through the channels within the foregoing range of velocities enables continuous (e.g., sustained) and efficient separation of the reacted/precipitated phosphorus and increases the operating duration for the ultrafiltration membrane and allows for a reduction in the overall size of the membrane system (in part, because of the reduction in fouling associated with these unique process conditions). It has been found that this combination allows for sustained operation at flux rates through the ultrafiltration membrane within a range between approximately 40 liters/m$^2$/hr (LMH) and 400 LMH, e.g., at least 150 LMH, 200 LMH, 250, LMH, 300 LMH, 350 LMH, 400 LMH, or a range between and including any two of the foregoing values. According to an exemplary embodiment, operation 410 may include reducing an amount of precipitated phosphorus in the effluent, via the ultrafiltration membrane, to approximately 0.075 mg/L or less, or another amount as described above.

In some embodiments, method 400 additionally includes passing the treated effluent through a second ultrafiltration membrane arranged in series with the first ultrafiltration membrane to further reduce the concentration of inorganic solids in the treated effluent leaving the water treatment system. Operation 410 may further include combining the phosphorus laden sludge leaving the ultrafiltration membrane with a second portion of the concentrated activated sludge leaving the intermediate thickening system so that the combined phosphorus and biosolids mass from the biological treatment operation can be disposed of or otherwise handled.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As used herein, the term "approximately" will be understood by those of skill in the art to have its normal definition. However, where such meaning is unclear in connection with a numerical value, "approximately" means that a range of ±10% of the numerical value is intended. For example, "approximately 3%" would include values from 2.7% to 3.3%.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," etc., mean plus or minus twenty percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method, comprising:
   receiving water;
   adding a coagulating and flocculating agent to the water to provide a flocculated effluent comprising precipitated phosphorus solids; and
   passing the flocculated effluent through an ultrafiltration membrane at sustained flux rates, comprising:
      increasing a concentration of recirculating solids within the ultrafiltration membrane to at least approximately 10,000 mg/L total suspended solids; and
      separating the precipitated phosphorus solids from the flocculated effluent and to provide a low-phosphorus stream at a first outlet of the ultrafiltration membrane and a high-phosphorus stream at a second outlet of the ultrafiltration membrane.

2. The method of claim 1, wherein receiving water comprises receiving one of a potable water supply or an at least partially treated wastewater, and wherein adding the coagulating and flocculating agent to the water comprises adding the coagulating and flocculating agent to the water to increase a concentration of undissolved solids in the water to approximately 0.5 mg/L or greater.

3. The method of claim 1, wherein increasing the concentration of recirculating solids within the ultrafiltration membrane comprises recirculating the flocculated effluent through the ultrafiltration membrane to increase the concentration of recirculating solids within the ultrafiltration membrane to within a range between approximately 10,000 mg/L to 40,000 mg/L.

4. The method of claim 3, further comprising passing the flocculated effluent through the ultrafiltration membrane at sustained flux rates within a range between approximately 150 LMH to 350 LMH.

5. The method of claim 1, wherein the ultrafiltration membrane is a tubular crossflow membrane, and wherein passing the flocculated effluent through the ultrafiltration membrane comprises passing the flocculated effluent from an inside to an outside of the tubular crossflow membrane.

6. The method of claim 1, further comprising introducing one of an acid or a base to the water via pH control system to adjust the pH of the water to within a range between approximately 5 to 8.

7. The method of claim 1, wherein adding the coagulating and flocculating agent comprises adding one of alum, ferric salt, poly aluminum chloride, ACH, or a rare earth material to the water.

8. The method of claim 1, further comprising passing the water through one of an intermediate thickening system or pre-filtration system to separate biodegradable organics from the water.

9. The method of claim 1, wherein passing the flocculated effluent through the ultrafiltration membrane comprises passing the flocculated effluent across an inner wall of the ultrafiltration membrane at velocities within a range between approximately 0.5 and 5 meters per second.

10. The method of claim 1, wherein passing the flocculated effluent through the ultrafiltration membrane comprises continuously passing flocculated effluent into the ultrafiltration membrane for at least a period of weeks before performing a cleaning operation.

\* \* \* \* \*